(12) United States Patent  
Yen et al.

(10) Patent No.: US 7,535,971 B2  
(45) Date of Patent: May 19, 2009

(54) METHOD AND APPARATUS FOR ANTENNA DIVERSITY

(75) Inventors: Kuang-Yu Yen, Tai-Chung (TW); Der-Zheng Liu, Tai-Nan (TW); Shu-Hua Yang, Taipei (TW); Chih-Hung Tsai, Kao-Hsiung Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 632 days.

(21) Appl. No.: 11/164,486

(22) Filed: Nov. 24, 2005

(65) Prior Publication Data

US 2006/0203945 A1 Sep. 14, 2006

(30) Foreign Application Priority Data

Nov. 26, 2004 (TW) .............................. 93136647 A

(51) Int. Cl.
*H04B 7/02* (2006.01)
*H04L 1/02* (2006.01)

(52) U.S. Cl. ................ 375/267; 375/299; 375/347; 455/13.3; 455/101; 370/334; 370/339

(58) Field of Classification Search ................ 375/267, 375/299, 347; 455/13.3, 101; 370/334, 339
See application file for complete search history.

(56) References Cited

U.S. PATENT DOCUMENTS 7,366,508 B2 * 4/2008 Hasegawa et al. ........... 455/424
2004/0147289 A1 7/2004 Paljug et al.

* cited by examiner

*Primary Examiner*—Ted Wang
(74) *Attorney, Agent, or Firm*—Winston Hsu

(57) ABSTRACT

A receiver includes a plurality of antennas; a switching device coupled to the antennas for selecting one of the antennas to receive transmitted signals; a demodulator coupled to the switching device for demodulating the transmitted signals to generate demodulated signals; and a control circuit coupled to the demodulator and the switching device, for counting a specific type of packets within the demodulated signals so as to accordingly control the switching device.

22 Claims, 2 Drawing Sheets

METHOD AND APPARATUS FOR ANTENNA DIVERSITY

BACKGROUND OF THE INVENTION

1. Field of the Invention

The present invention relates to wireless communications, and more particularly, to a method and apparatus of antenna diversity.

2. Description of the Prior Art

In a wireless communication system, the multipath fading effect usually deteriorates the incoming signals received at the receiver end. Due to different signal transmission paths with different timing delay and signal attenuation, signals received by the receiver end often interfere with each other. In general, antenna diversity techniques are commonly employed to solve the aforementioned problems.

The conventional antenna diversity method typically selects an antenna which has the greatest signal strength from a plurality of antennas to be a receiving antenna for receiving signals. However, in some wireless communication devices, the symbol boundary identification may easily make mistakes when the signal strength of the receiving antenna is greater than a predetermined strength, thereby reducing the throughput of the receiver end.

SUMMARY OF THE INVENTION

It is therefore an objective of the claimed invention to provide a method and apparatus of antenna diversity to solve the above-mentioned problems.

According to an exemplary embodiment of the present invention, a receiver is disclosed comprising: a plurality of antennas; a switching device coupled to the antennas for selecting one of the antennas to receive transmitted signals; a demodulator coupled to the switching device for demodulating the transmitted signals to generate demodulated signals; and a control circuit coupled to the demodulator and the switching device for counting packets of a specific type within the demodulated signal so as to accordingly control the switching device.

According to an exemplary embodiment of the present invention, an antenna diversity method is disclosed comprising: selecting a first antenna as a receiving antenna to receive transmitted signals; demodulating the transmitted signals by the receiving antenna to produce demodulated signals; counting packets of a specific type within the demodulated signals to generate a counting value; and determining whether to select a second antenna as the receiving antenna according to the counting value.

These and other objectives of the present invention will no doubt become obvious to those of ordinary skill in the art after reading the following detailed description of the preferred embodiment that is illustrated in the various figures and drawings.

DETAILED DESCRIPTION

The antenna diversity techniques disclosed in the present invention are utilized in the wireless communication protocols which have a retry/retransmission mechanism, such as the wireless LAN (WLAN), wireless data transmission service and so forth. In the wireless communication protocols having the retry/retransmission mechanism, when a receiver successfully receives a packet from a transmitter, the receiver returns an ACK message to the transmitter. If the transmitter does not receive an ACK message corresponding to a transmitted packet over a predetermined time period, the transmitter resends the packet to the receiver and marks the packet as a retry packet by writing a predetermined value in a header of the retry packet. In the IEEE 802.11 WLAN standards series, for example, the retry flag of a frame control field in the header of the retry packet is set to 1. Accordingly, when the receiver receives a packet, it can determine whether the received packet is a retry packet according to the value of the retry flag recorded in the header of the packet.

The antenna diversity techniques of the present invention can be extended to a multi-antenna architecture. For convenience of description, a two-antenna receiver is employed as an example to elaborate the antenna diversity methods of the prevent invention.

Figure 1:
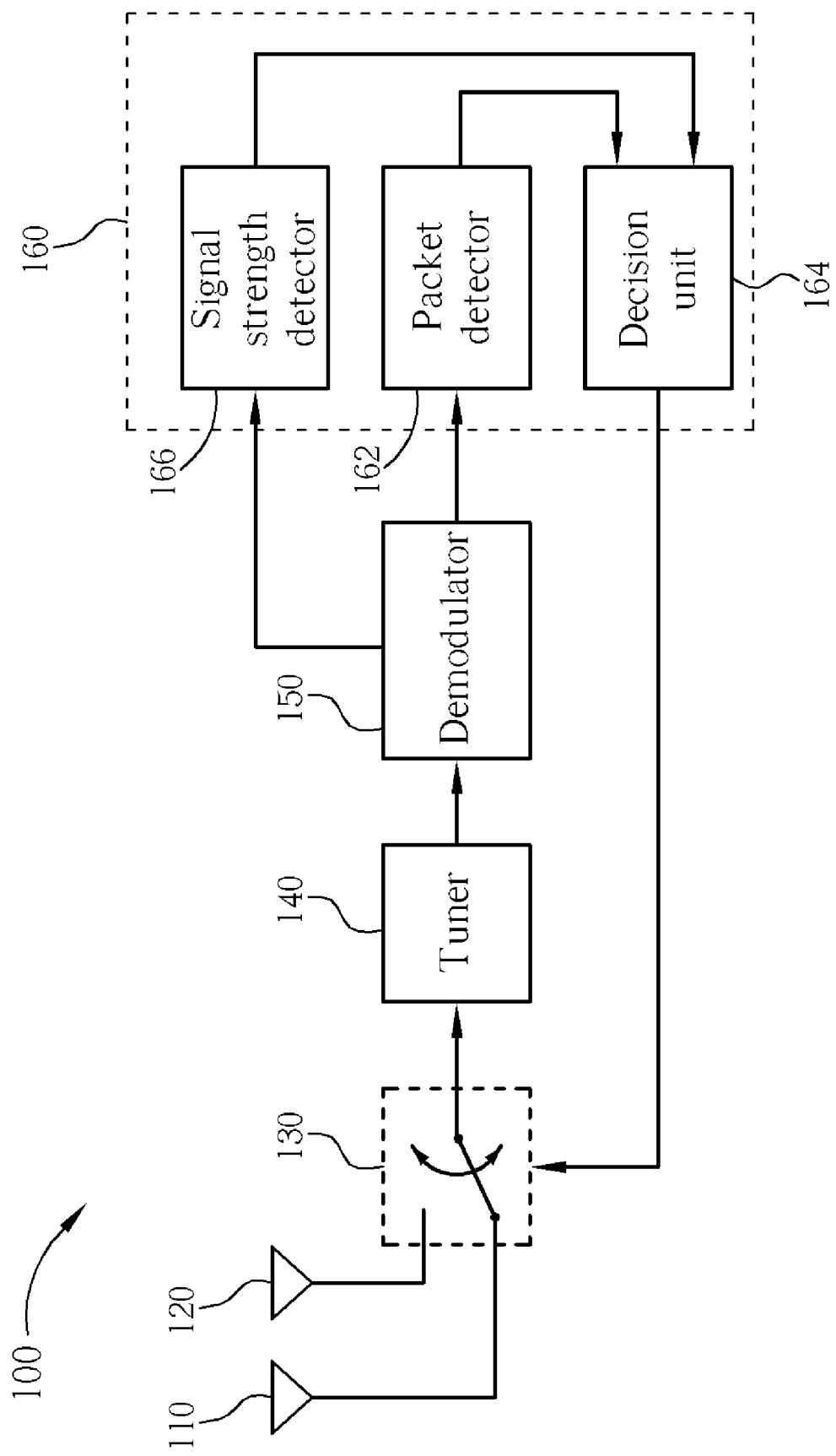
FIG. 1 is a block diagram of a receiver according to one embodiment of the present invention.

Please refer to FIG. 1, which depicts a block diagram of a receiver 100 according to one embodiment of the present invention. The receiver 100 comprises a first antenna 110, a second antenna 120, a switching device 130, a tuner 140, a demodulator 150, and a control circuit 160. In this embodiment, the control circuit 160 comprises a packet detector 162, a decision unit 164 and a signal strength detector 166.

Figure 2:
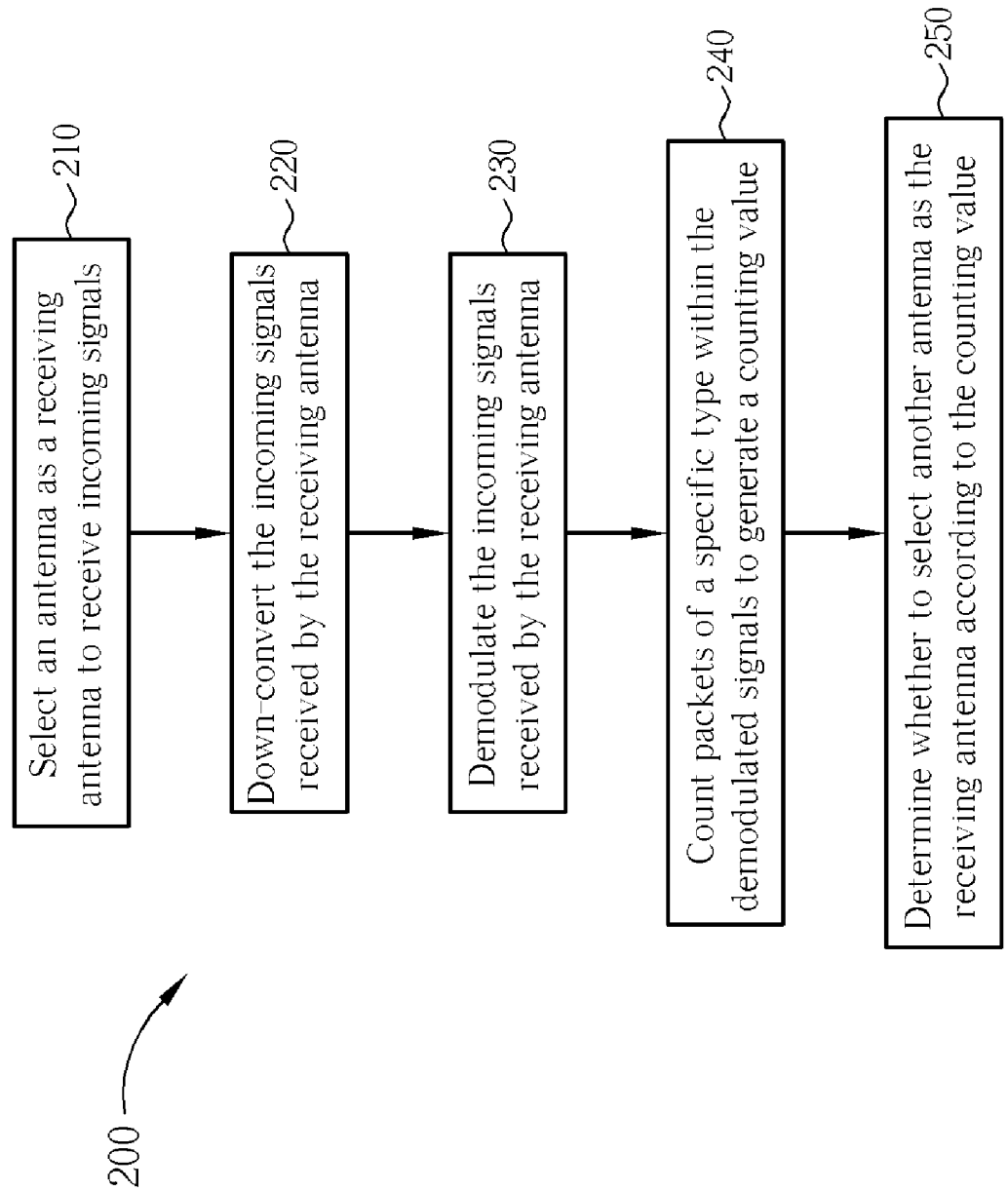
FIG. 2 is a flowchart illustrating an antenna diversity method according to one embodiment of the present invention.

FIG. 2 shows a flowchart 200 illustrating an antenna diversity method according to one embodiment of the present invention. The steps of the flowchart 200 are described below.

In Step 210, the receiver 100 selects a default antenna such as the first antenna 110 as a receiving antenna to receive incoming signals.

In Step 220, the tuner 140 down-converts the incoming signals received by the receiving antenna.

In Step 230, the demodulator 150 then demodulates the processed incoming signals output from the tuner 140 to produce demodulated signals. The operations and implementations of the tuner 140 and the demodulator 150 are well known in the art and further details are therefore omitted.

In Step 240, the control circuit 160 determines the signal quality of the receiving antenna by detecting the appearance frequency (or amount) of the retry packets within the demodulated signals outputted from the demodulator 150. A greater number of retry packets within the demodulated signals means worse signal quality of the receiving antenna. In one embodiment, the packet detector 162 of the control circuit 160 detects and counts an amount of the retry packets within the demodulated signals and generates a corresponding counting value Retry_cnt. As mentioned above, the packet detector 162 can determine if a packet is a retry packet according to the retry flag recorded in the header of the packet.

In Step 250, the decision unit 164 then compares the counting value Retry_cnt with a threshold value Retry_th. In this embodiment, when the counting value Retry_cnt is greater than the threshold value Retry_th, the decision unit 164 controls the switching device 130 to switch to the second antenna 120. In other words, the second antenna 120 is selected to replace the first antenna 110 as the receiving antenna.

After switching to the second antenna 120, the receiver 100 repeatedly performs Steps 220 through 250 so as to decide whether to keep on utilizing the second antenna 120 as the receiving antenna or to switch back to the first antenna 110.

In another embodiment, the decision unit 164 increases the threshold value Retry_th while switching the receiving antenna in order to reduce the probability of switching antennas when the signal qualities of both antennas are not ideal. For example, in the above Step 250, when the counting value Retry_cnt is greater than the threshold value Retry_th, the decision unit 164 can control the switching device 130 to switch to the second antenna 120 and update the threshold value Retry_th with a counting value Retry_cnt+n, where n is adjustable by the system designer. In another embodiment, the decision unit 164 can also decrease the threshold value Retry_th by a predetermined decrement every specific time period in order to prevent an antenna with worse signal quality of the receiver 100 from being selected as the receiving antenna.

In some wireless communication protocols such as 802.11a, 802.11b and 802.11g, the receiving antenna of the receiver 100 may possibly enable the slow-down mechanism of the transmitter when the signal quality is not ideal. In this situation, the appearance frequency of the retry packets within the following received signals is typically reduced and may cause an illusion that the signal quality of the receiving antenna is good. In order to prevent the decision unit 164 from erroneously determining that the receiving antenna has good signal quality under the aforementioned situation, the control circuit 160 can record the time the packet detector 162 uses to detect a specific number of packets in Step 240 and accordingly set a time limit for the packet detector 162 to detect the specific number of packets after the receiving antenna is switched.

For example, supposing that the total time the packet detector 162 uses to detect the specific number of packets when the receiver 100 utilizes the first antenna 110 as the receiving antenna is Tm, then the control circuit 160 can set a time limit Tm_th for the packet detector 162 to detect the specific number of packets after switching the receiving antenna to be Tm*1.2. Note that the ratio 1.2 is merely an example. When the receiving antenna is switched to be the second antenna 120, if the time the packet detector 162 uses to detect the specific number of packets is over the time limit Tm_th, the decision unit 164 determines that the slow-down mechanism of the transmitter is enabled and therefore controls the switching device 130 to switch back to the first antenna 110.

Note that the method the control circuit 160 uses to determine the appearance frequency of the retry packets within the demodulated signals in Step 240 is not limited to the above embodiments. For example, in another embodiment, the packet detector 162 may count an amount of retry packets appearing within a predetermined time period to generate the counting value Retry_cnt in Step 240.

As in the previous descriptions, the antenna diversity method of the present invention is able to improve the resolution to the prior art problem of the symbol boundary identification easily having mistakes when the signal strength of the receiving antenna is greater than a predetermined strength. Therefore, in Step 240, the signal strength detector 166 of the control circuit 160 can be utilized to detect the signal strength of the receiving antenna and the decision unit 164 can control the switching device 130 to select another antenna as the receiving antenna only when the counting value Retry_cnt is greater than the threshold value Retry_th and the detected signal strength is greater than a predetermined strength. In another embodiment, the control circuit 160 utilizes the signal strength detector 166 to detect the signal strengths of both the first and second antennas 110 and 120 and utilizes the aforementioned antenna diversity mechanism only when the signal strengths of both the first and second antennas are greater than the predetermined strength.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiver comprising:
   a plurality of antennas;
   a switching device coupled to the antennas for selecting one of the antennas to receive transmitted signals;
   a demodulator coupled to the switching device for demodulating the transmitted signals to generate demodulated signals; and
   a control circuit coupled to the demodulator and the switching device for counting packets of a specific type within the demodulated signals so as to accordingly control the switching device, wherein the control circuit comprises:
      a packet detector for counting an amount of packets of the specific type appearing within the demodulated signal to generate a counting value; and
      a decision unit coupled to the packet detector for comparing the counting value with a threshold value and for controlling the switching device according to the comparison result, for controlling the switching device to select another antenna for receiving the transmitted signals when the counting value is greater than the threshold value, and for increasing the threshold value while controlling the switching device to select another antenna to receive the transmitted signals.

2. The receiver of claim 1, further comprising:
   a tuner coupled between the switching device and the demodulator for down-converting the transmitted signals.

3. The receiver of claim 1, wherein the packets of the specific type are retry packets.

4. The receiver of claim 1 utilized in a communication protocol having a retry/retransmission mechanism.

5. A receiver comprising:
   a plurality of antennas;
   a switching device coupled to the antennas for selecting one of the antennas to receive transmitted signals;
   a demodulator coupled to the switching device for demodulating the transmitted signals to generate demodulated signals; and
   a control circuit coupled to the demodulator and the switching device for counting packets of a specific type within the demodulated signals so as to accordingly control the switching device, wherein the control circuit comprises:
      a packet detector for counting an amount of packets of the specific type appearing within the demodulated signal to generate a counting value;
      a decision unit coupled to the packet detector for comparing the counting value with a threshold value and for controlling the switching device according to the comparison result, and
      a signal strength detector coupled to the demodulator and the decision unit for determining a signal strength of the receiving antenna;
   wherein the decision unit controls the switching device to select another antenna for receiving the transmitted signals when the counting value is greater than the threshold value and the signal strength is greater than a predetermined strength.

6. The receiver of claim 5, further comprising:
a tuner coupled between the switching device and the demodulator for down-converting the transmitted signals.

7. A receiver comprising:
a plurality of antennas;
a switching device coupled to the antennas for selecting one of the antennas to receive transmitted signals;
a demodulator coupled to the switching device for demodulating the transmitted signals to generate demodulated signals; and
a control circuit coupled to the demodulator and the switching device for counting packets of a specific type within the demodulated signals so as to accordingly control the switching device,
wherein the control circuit comprises:
a packet detector for counting an amount of packets of the specific type appearing within the demodulated signal to generate a counting value; and
a decision unit coupled to the packet detector for comparing the counting value with a threshold value and for controlling the switching device according to the comparison result,
wherein the decision unit controls the switching device to select another antenna for receiving the transmitted signals if the packet detector detects a specific number of packets over a time limit, and adjusts the time limit while controlling the switching device to select another antenna for receiving the transmitted signals.

8. The receiver of claim 7, further comprising:
a tuner coupled between the switching device and the demodulator for down-converting the transmitted signals.

9. The receiver of claim 7, wherein the packets of the specific type are retry packets.

10. The receiver of claim 7 utilized in a communication protocol having a retry/retransmission mechanism.

11. An antenna diversity method comprising:
selecting a first antenna to be a receiving antenna to receive transmitted signals;
demodulating the transmitted signals by the receiving antenna to produce demodulated signals;
counting packets of a specific type within the demodulated signal to generate a counting value;
determining whether to select a second antenna to be the receiving antenna according to the counting value;
selecting the second antenna to be the receiving antenna when the counting value is greater than a threshold value, and
increasing the threshold value while selecting the second antenna to be the receiving antenna.

12. The antenna diversity method of claim 11, further comprising:
down-converting the transmitted signals by the receiving antenna before demodulating the transmitted signals.

13. The antenna diversity method of claim 11, wherein the counting step further comprises:
counting an amount of packets of the specific type appeared within a predetermined period to generate the counting value.

14. The antenna diversity method of claim 11, wherein the packets of the specific type are retry packets.

15. An antenna diversity method comprising:
selecting a first antenna to be a receiving antenna to receive transmitted signals;
demodulating the transmitted signals by the receiving antenna to produce demodulated signals;
counting packets of a specific type within the demodulated signal to generate a counting value;
determining whether to select a second antenna to be the receiving antenna according to the counting value;
detecting a signal strength of the receiving antenna; and
selecting the second antenna to be the receiving antenna when the counting value is greater than a threshold value and the signal strength is greater than a predetermined strength.

16. The antenna diversity method of claim 15, further comprising:
increasing the threshold value while selecting the second antenna to be the receiving antenna.

17. The antenna diversity method of claim 15, wherein the counting step further comprises:
counting an amount of packets of the specific type appeared within a predetermined period to generate the counting value.

18. An antenna diversity method comprising:
selecting a first antenna to be a receiving antenna to receive transmitted signals;
demodulating the transmitted signals by the receiving antenna to produce demodulated signals;
counting packets of a specific type within the demodulated signal to generate a counting value;
determining whether to select a second antenna to be the receiving antenna according to the counting value;
counting an amount of packets of the specific type appeared within a predetermined number of packets of the demodulated signal to generate the counting value;
if a time used for detecting the predetermined number of packets is over a certain time limit, selecting the second antenna to be the receiving antenna; and
increasing the threshold value while selecting the second antenna to be the receiving antenna.

19. The antenna diversity method of claim 18, further comprising:
down-converting the transmitted signals by the receiving antenna before demodulating the transmitted signals.

20. The antenna diversity method of claim 18, wherein the counting step further comprises:
counting an amount of packets of the specific type appeared within a predetermined period to generate the counting value.

21. The antenna diversity method of claim 18, wherein the packets of the specific type are retry packets.

22. The antenna diversity method of claim 18 utilized in a communication protocol having a retry/retransmission mechanism.

* * * * *